United States Patent
Park

(10) Patent No.: US 12,151,898 B2
(45) Date of Patent: Nov. 26, 2024

(54) TRANSFER APPARATUS

(71) Applicant: Samsung Display Co., LTD., Yongin-si (KR)

(72) Inventor: Sun Kyun Park, Asan-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 178 days.

(21) Appl. No.: 17/834,504

(22) Filed: Jun. 7, 2022

(65) Prior Publication Data
US 2023/0028241 A1 Jan. 26, 2023

(30) Foreign Application Priority Data
Jul. 22, 2021 (KR) .......... 10-2021-0096365

(51) Int. Cl.
*B65G 15/24* (2006.01)
(52) U.S. Cl.
CPC .... *B65G 15/24* (2013.01); *B65G 2812/02128* (2013.01)
(58) Field of Classification Search
None
See application file for complete search history.

(56) References Cited

U.S. PATENT DOCUMENTS

| | | | |
|---|---|---|---|
| 10,549,916 B2* | 2/2020 | Pajevic | G05D 1/0227 |
| 10,889,441 B1* | 1/2021 | Pajevic | B65G 1/1376 |
| 11,422,569 B2* | 8/2022 | Pardasani | G05D 1/0297 |
| 11,738,977 B2* | 8/2023 | Lilley | B66F 9/063 |
| | | | 414/495 |

FOREIGN PATENT DOCUMENTS

| | | |
|---|---|---|
| JP | 11-43296 | 2/1999 |
| KR | 10-0323060 | 6/2002 |
| KR | 10-2006-0028299 | 3/2006 |
| KR | 10-1841148 | 3/2018 |
| KR | 102151764 B1 * | 9/2020 |
| KR | 20190126558 A * | 9/2020 |

* cited by examiner

*Primary Examiner* — Kavel Singh
(74) *Attorney, Agent, or Firm* — KILE PARK REED & HOUTTEMAN PLLC

(57) ABSTRACT

A transfer apparatus includes a transfer part; an equipment part separated from the transfer part. A groove is disposed in one of the transfer part and the equipment part, and a protrusion is disposed in the other of the transfer part and the equipment part, the transfer part and the equipment part are connected by coupling of the groove and the protrusion; and an object on the transfer part is transferred onto the equipment part.

19 Claims, 6 Drawing Sheets

TRANSFER APPARATUS

CROSS-REFERENCE TO RELATED APPLICATION

This application claims priority to and the benefit of Korean Patent Application No. 10-2021-0096365 under 35 U.S.C. § 119, filed in the Korean Intellectual Property Office (KIPO) on Jul. 22, 2021, the entire contents of which are incorporated herein by reference.

BACKGROUND

1. Technical Field

The disclosure relates to a transfer apparatus.

2. Description of the Related Art

In a process, a transfer carriage may be used. The transfer carriage refers to a trackless vehicle that manually or automatically loads freight on a vehicle body thereof, drives to a designated place, and manually or automatically transfers or loads freight.

Examples of the transfer carriage include a rail guided vehicle (RGV) that moves along a rail, an automated guided vehicle (AGV) that moves a designated path with its own driving force by a controller, a laser guided vehicle (LGV) that moves by a laser navigation method, a manual guided vehicle (MGV) that may be manually pushed and controlled by a worker, and the like.

These transfer carriages load/unload products while moving back and forth between process equipment in a state in which products are loaded.

The above information disclosed in this Background section is only for enhancement of understanding of the background of the disclosure, and therefore it may contain information that does not form the prior art that is already known in this country to a person of ordinary skill in the art.

SUMMARY

Embodiments are to provide a transfer apparatus that may effectively transfer objects in a transfer process.

An embodiment provides a transfer apparatus including a transfer part; an equipment part separated from the transfer part. A groove may be disposed in one of the transfer part and the equipment part, and a protrusion may be disposed in the other of the transfer part and the equipment part, the transfer part and the equipment part may be connected by coupling of the groove and the protrusion, and an object on the transfer part may be transferred onto the equipment part.

A groove may be disposed in the transfer part, and a protrusion may be disposed in the equipment part.

A groove may be disposed in the equipment part, and a protrusion may be disposed in the transfer part.

The transfer part may include transfer belts positioned at edges of the transfer part, the equipment part may include equipment belts positioned at edges of the equipment part, and the object may be transferred by rotation of the transfer belts and the equipment belts.

The transfer part may move to deliver the object to the equipment part, the equipment part may be fixed, and the object that has been processed in the equipment part may be transferred back to the transfer part.

The object on the transfer part may have an H shape.

A lower surface of the object may not directly contact the transfer part.

Another embodiment provides a transfer apparatus including a transfer part; an equipment part separated from the transfer part. The transfer part may include transfer belts that are positioned at edges of the transfer part and rotate; the equipment part may include equipment belts that are positioned at edges of the equipment part and rotate, and a width of the equipment part is narrower than a separation distance between the transfer belts positioned at the edges of the transfer part.

An object may be transferred in case that the transfer belts move forward, the transfer belts that have moved may be positioned with the equipment belts between the transfer belts, and the object may be transferred from the transfer belts to the equipment belts.

Another embodiment provides a transfer apparatus including a transfer part, an equipment part separated from the transfer part. The transfer part may include transfer belts that are positioned at edges of the transfer part and rotate, the equipment part may include equipment belts that are positioned at edges of the equipment part and rotate, and a separation distance between the transfer belts may be narrower than that between the equipment belts.

An object may be transferred in case that the transfer belts move forward, the transfer belts that have moved may be positioned between the equipment belts positioned at edges of the equipment part, and the object may be transferred from the transfer belts to the equipment belts.

The transfer belts that have moved may overlap the equipment part in a cross-sectional view.

Another embodiment provides a transfer method including moving a transfer part in which an object to be transferred is positioned; connecting the transfer part and an equipment part; and moving the object to be transferred from the transfer part to the equipment part. A groove may be disposed in one of the transfer part and the equipment part, and a protrusion may be disposed in the other of the transfer part and the equipment part, and the transfer part and the equipment part may be connected by coupling of the groove and the protrusion.

The transfer part may include transfer belts positioned at edges of the transfer part, the equipment part may include equipment belts positioned at edges of the equipment part, and an object may be transferred by rotation of the transfer belts and the equipment belts.

A groove may be disposed in the transfer part, and a protrusion may be disposed in the equipment part.

A groove may be disposed in the equipment part, and a protrusion may be disposed in the transfer part.

Another embodiment provides a transfer method including moving a transfer part in which an object to be transferred is positioned to face an equipment part; and moving transfer belts positioned at edges of the transfer part forward. The transfer belts that have moved may be positioned with the equipment part between the transfer belts, and the object may be transferred from the transfer belts to the equipment belts positioned on the equipment part.

A width of the equipment part may be narrower than a separation distance between the transfer belts.

Another embodiment provides a transfer method including moving a transfer part in which an object to be transferred is positioned to face an equipment part; and moving transfer belts positioned at edges of the transfer part forward. The transfer belts that have moved may be positioned between equipment belts positioned at edges of the equipment part, and the object may be transferred from the transfer belts to the equipment belts positioned on the equipment part.

A separation distance between the transfer belts may be narrower than a separation distance between the equipment belts.

According to the embodiments, it is possible to provide a transfer apparatus that may effectively transfer goods in a transfer process.

BRIEF DESCRIPTION OF THE DRAWINGS

An additional appreciation according to the embodiments of the disclosure will become more apparent by describing in detail the embodiments thereof with reference to the accompanying drawings, wherein.

DETAILED DESCRIPTION OF THE EMBODIMENTS

Figure 1:
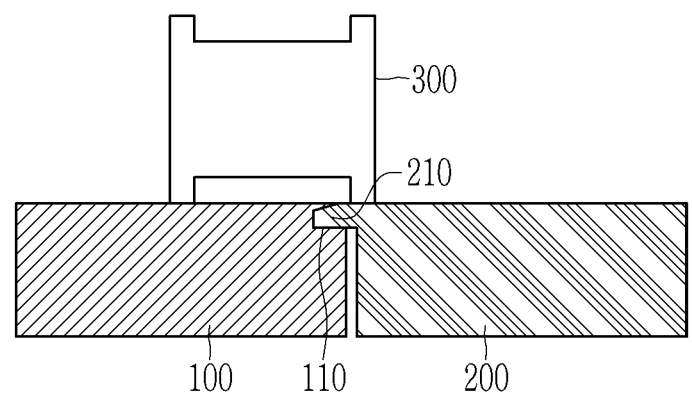
FIG. 1 schematically illustrates a transfer apparatus according to the embodiment.

The disclosure will be described more fully hereinafter with reference to the accompanying drawings, in which embodiments of the disclosure are shown. As those skilled in the art would realize, the described embodiment may be modified in various different ways, all without departing from the spirit or scope of the disclosure.

In order to clearly describe the disclosure, parts that are irrelevant to the description are omitted, and identical or similar constituent elements throughout the specification are denoted by the same reference numerals.

Further, in the drawings, the size and thickness of each element are arbitrarily illustrated for ease of description, and the disclosure is not necessarily limited to those illustrated in the drawings. In the drawings, the thicknesses of layers, films, panels, regions, areas, etc., may be exaggerated for clarity. In the drawings, for ease of description, the thicknesses of some layers and areas may be exaggerated.

It will be understood that when an element such as a layer, film, region, area or substrate is referred to as being "on" another element, it can be directly on the other element or intervening elements may also be present. In contrast, when an element is referred to as being "directly on" another element, there are no intervening elements present. Further, in the specification, the word "on" or "above" means positioned on or below the object portion, and does not necessarily mean positioned on the upper side of the object portion based on a gravitational direction.

In addition, unless explicitly described to the contrary, the word "comprise" and variations such as "comprises" or "comprising" will be understood to imply the inclusion of stated elements but not the exclusion of any other elements.

Further, throughout the specification, the phrase "in a plan view" or "on a plane" means viewing a target portion from the top, and the phrase "in a cross-sectional view" or "on a cross-section" means viewing a cross-section formed by vertically cutting a target portion from the side.

Unless otherwise defined or implied herein, all terms (including technical and scientific terms) used herein have the same meaning as commonly understood by those skilled in the art to which this disclosure pertains. It will be further understood that terms, such as those defined in commonly used dictionaries, should be interpreted as having a meaning that is consistent with their meaning in the context of the relevant art and the disclosure, and should not be interpreted in an ideal or excessively formal sense unless clearly so defined herein.

Hereinafter, a transfer apparatus according to the embodiment will be described in detail below with reference to the accompanying drawings.

FIG. 1 schematically illustrates a transfer apparatus according to the embodiment. Referring to FIG. 1, the transfer apparatus according to the embodiment includes a transfer part 100 and an equipment part 200. The equipment part 200 is a part that is fixed and in which a process is performed, and the transfer part 100 is a part that provides a cassette 300 to the equipment part 200 while moving and recovers the cassette 300 for which a process has been performed. The cassette 300 may include a process object therein. For example, the cassette 300 may be a cleaning cassette for cleaning glass.

Referring to FIG. 1, the cassette 300 has an H shape. For example, a lower surface of the cassette 300 may not directly contact the transfer part 100 and the equipment part 200 to be spaced apart from them. This is because glass or the like is positioned inside the cassette 300, and in case that the lower surface of the cassette 300 directly contacts them, an impact may be applied to the glass positioned therein. Therefore, by forming the cassette 300 to have an H shape, it is possible to prevent the lower surface of the cassette 300 from directly contacting the transfer part 100 and the equipment part 200.

Particularly, when the cassette 300 is a cassette for cleaning UTG glass, the lower surface of the cassette 300 may not directly contact the transfer part 100 and the equipment part 200 to prevent the UTG glass from being broken.

Referring to FIG. 1, the transfer apparatus according to the embodiment includes a groove 110 formed in the transfer part 100. In addition, the equipment part 200 includes a protrusion 210 formed at a position corresponding to the transfer part 100. As shown in FIG. 1, while the protrusion 210 of the equipment part 200 is positioned in the groove 110 of the transfer part 100, the transfer part 100 and the equipment part 200 may be connected (or coupled). Accordingly, in case that the cassette 300 moves from the transfer part 100 to the equipment part 200, it is possible to prevent the cassette 300 from being caught in a gap between the transfer part 100 and the equipment part 200. As shown in FIG. 1, the protrusion 210 of the equipment part 200 may include an inclined surface. The groove 110 of the transfer part 100 may also be formed to have a shape corresponding to the inclined surface of the protrusion 210, so that the groove 110 and the protrusion 210 may be stably coupled.

Figure 2:
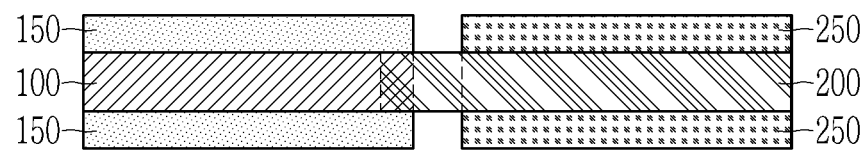
FIG. 2 schematically illustrates a plan view of the transfer apparatus according to the embodiment of FIG. 1.

FIG. 2 illustrates a schematic plan view of the transfer apparatus according to the embodiment of FIG. 1. As shown in FIG. 2, a transfer belt 150 may be positioned at both sides of the transfer part 100, and an equipment belt 250 may be positioned at both sides of the equipment part 200. A cassette is positioned on the transfer belt 150, and as the transfer belt 150 moves, the cassette may be conveyed to the equipment part 200. The cassette is moved onto the equipment belt 250, and may be moved as the equipment belt 250 moves. The cassette, after being processed, may be returned to the transfer part 100 from the equipment part 200.

As shown in FIG. 2, the equipment part 200 and the transfer part 100 are coupled by the protrusion 210 of the equipment part 200. Accordingly, it is possible to prevent the cassette from being caught in the gap between the equipment part 200 and the transfer part 100 during the transfer of the cassette.

Figure 3:
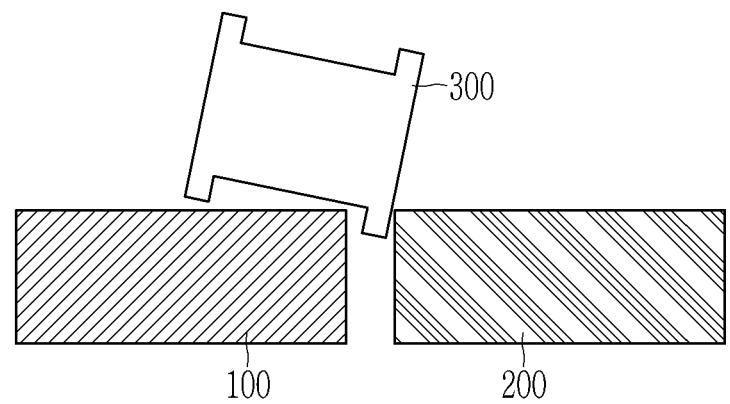
FIG. 3 schematically illustrates an embodiment in which a transfer part and an equipment part are not connected in the same area as in FIG. 1, and FIG. 4 schematically illustrates an embodiment in which a transfer part and an equipment part are not connected in the same area as in FIG. 2.
Figure 4:
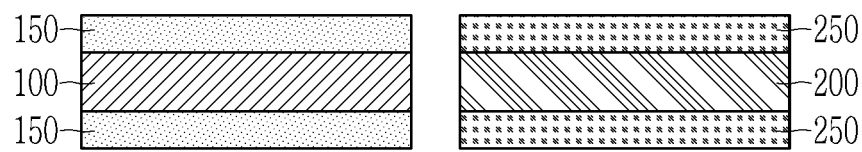

FIG. 3 illustrates an embodiment in which the transfer part 100 and the equipment part 200 are not coupled in the same area as in FIG. 1, and FIG. 4 illustrates an embodiment in which the transfer part 100 and the equipment part 200 are not coupled in the same area as in FIG. 2.

Referring to FIG. 3, in case that the transfer part 100 and the equipment part 200 are not coupled, the cassette 300 may fall into a separation portion between the transfer part 100 and the equipment part 200. Therefore, the cassette 300 may not be effectively transferred. As shown in FIG. 3, as the cassette 300 is inclined at the separation portion between the transfer part 100 and the equipment part 200, glass inside the cassette 300 may be damaged. As shown in FIG. 4, the transfer part 100 and the equipment part 200 are spaced apart from each other, and thus the cassette 300 may not be effectively transferred.

However, in the case of the transfer apparatus according to the embodiment, the transfer part 100 and the equipment part 200 are coupled by the groove 110 of the transfer part 100 and the protrusion 210 of the equipment part 200 as shown in FIG. 1 and FIG. 2. Therefore, the cassette 300 may be effectively transferred.

Figure 5:
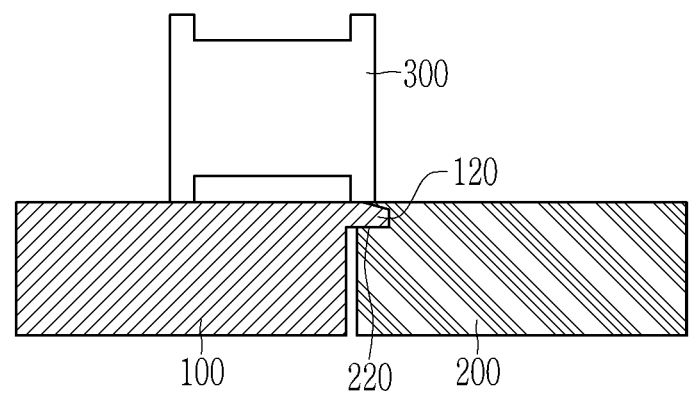
FIG. 5 schematically illustrates the same area as that of FIG. 1 with respect to another embodiment.
Figure 6:
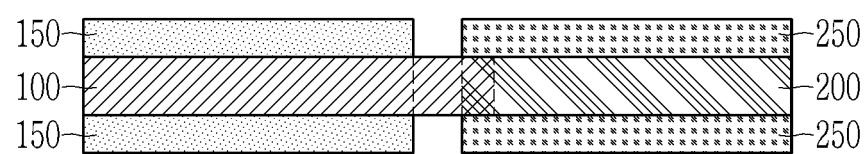
FIG. 6 schematically illustrates the same area as that of FIG. 2 with respect to another embodiment.

FIG. 5 illustrates the same area as that of FIG. 1 with respect to another embodiment, and FIG. 6 illustrates the same area as that of FIG. 2 with respect to another embodiment. Referring to FIG. 5 and FIG. 6, the transfer apparatus according to the embodiment is different from the transfer apparatus according to the embodiment of FIG. 1 and FIG. 2 at least in that positions of a protrusion and a groove are opposite. Detailed descriptions of the same constituent elements will be omitted.

Referring to FIG. 5, an equipment part 200 includes a groove 220. In addition, the transfer part 100 includes a protrusion 120. The protrusion 120 of the transfer part 100 is coupled (or connected) to the groove 220 of the equipment part 200, and thus the transfer part 100 and the equipment part 200 are coupled. As such, even in case that the protrusion is formed in the transfer part 100 instead of the equipment part 200, a gap between the transfer part 100 and the equipment part 200 may be eliminated as in FIG. 1 and FIG. 2, and thus the cassette 300 may be effectively transferred by the coupling of the transfer part 100 and the equipment part 200.

Figure 7:
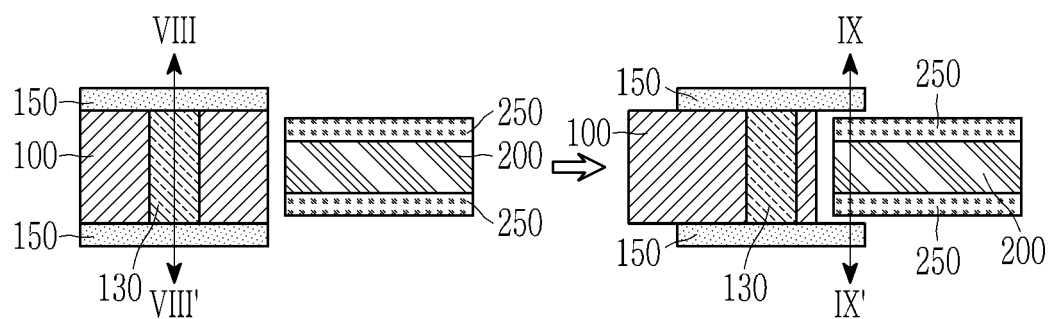
FIG. 7 schematically illustrates a transfer apparatus according to another embodiment.

FIG. 7 illustrates a transfer apparatus according to another embodiment. Referring to FIG. 7, the transfer apparatus according to the embodiment includes a transfer part 100 and an equipment part 200 that have different widths. For example, the width of the equipment part 200 may be narrower than that of the transfer part 100.

Figure 8:
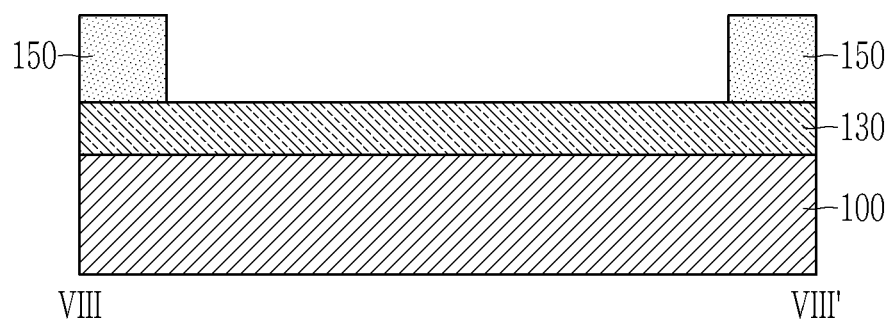
FIG. 8 schematically illustrates a cross-sectional view taken along line VIII-VIII' of FIG. 7.
Figure 9:
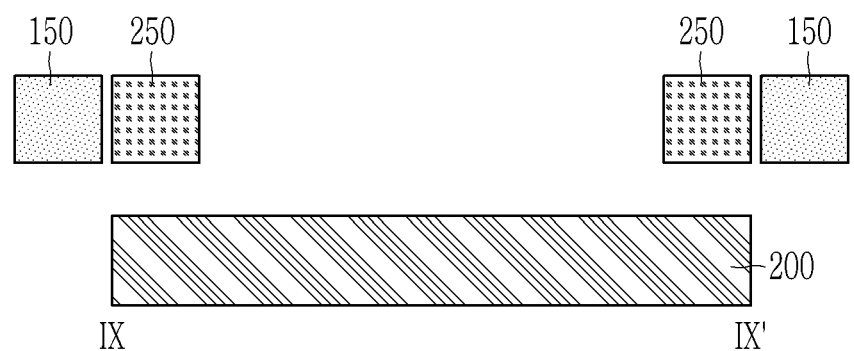
FIG. 9 schematically illustrates a cross-sectional view taken along line IX-IX' of FIG. 7.

FIG. 8 illustrates a cross-sectional view taken along line VIII-VIII' of FIG. 7, and FIG. 9 illustrates a cross-sectional view taken along line IX-IX' of FIG. 7.

Referring to FIG. 7 and FIG. 8, a transfer belt 150 is positioned on the transfer part 100 of the transfer apparatus according to the embodiment. A band part 130 is positioned between the transfer belt 150 and the transfer part 100. The band part 130 may connect the transfer parts 150 spaced apart from each other as one. Although FIG. 8 illustrates the structure in which the band part 130 is in contact with the transfer part 100, the band part 130 may be positioned to be spaced apart from the transfer part 100.

Referring to FIG. 7, the transfer belt 150 moves forward in order to couple the transfer part 100 and the equipment part 200. In this case, since a width of the equipment part 200 is narrower than that of the transfer part 100, the equipment part 200 is positioned between the transfer belts 150.

Accordingly, as shown in FIG. 9, the transfer belt 150 of the transfer part 100 and the equipment belt 250 of the equipment part 200 are positioned side by side, and the cassette that is transferred may move from the transfer belt 150 to the equipment belt 250. In this case, the cassette may be effectively transferred between the transfer part 100 and the equipment part 200 without a separate protrusion or groove.

In the embodiment of FIG. 7 and FIG. 8, the width of the equipment part 200 may be narrower than the separation distance between the transfer belts 150. This is to position the equipment part 200 between the transfer belt 150 as shown in FIG. 7.

Figure 10:
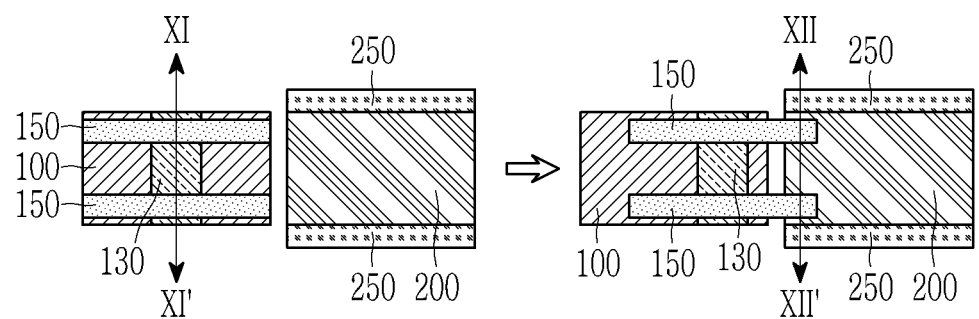
FIG. 10 schematically illustrates a transfer apparatus according to another embodiment.

FIG. 10 illustrates a transfer apparatus according to another embodiment. Referring to FIG. 10, the transfer apparatus according to the embodiment includes a transfer part 100 and an equipment part 200 that have different widths. For example, a width of the transfer part 100 may be narrower than that of the equipment part 200.

Figure 11:
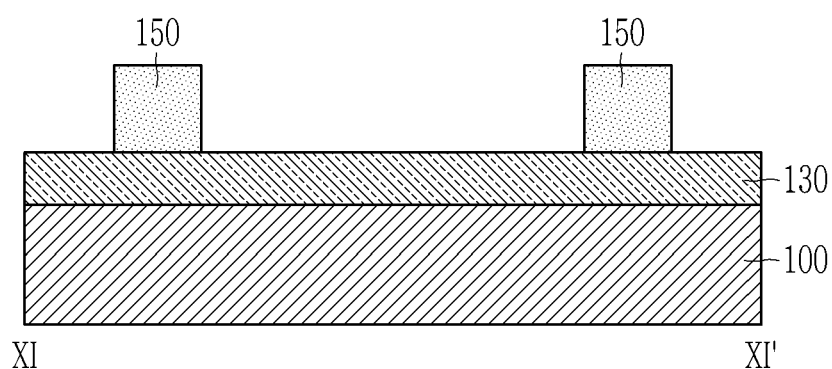
FIG. 11 schematically illustrates a cross-sectional view taken along line XI-XI' of FIG. 10.
Figure 12:
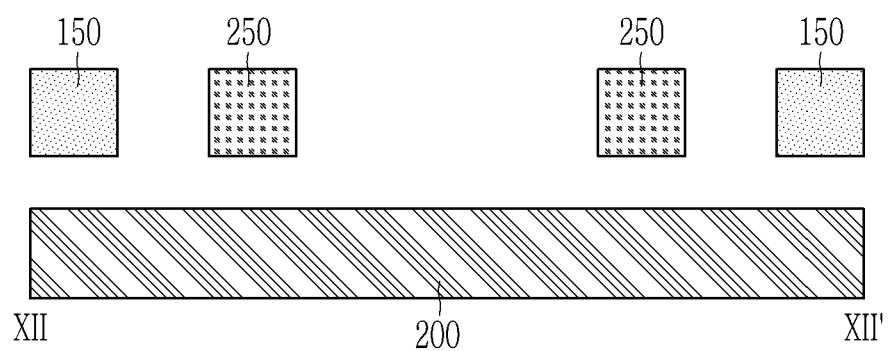
FIG. 12 schematically illustrates film including cross-sectional view taken along line XII-XII' of FIG. 10.

FIG. 11 illustrates a cross-sectional view taken along line XI-XI' of FIG. 10. FIG. 12 illustrates a cross-sectional view taken along line XII-XII' of FIG. 10.

Referring to FIG. 11, a transfer belt 150 is positioned on the transfer part 100 of the transfer apparatus according to the embodiment. A band part 130 is positioned between the transfer belt 150 and the transfer part 100. The band part 130 connects the transfer parts 150 spaced apart from each other as one. Although FIG. 11 illustrates the structure in which the band part 130 is in contact with the transfer part 100, the band part 130 may be positioned to be spaced apart from the transfer part 100.

Referring to FIG. 10, the transfer belt 150 moves forward in order to couple the transfer part 100 and the equipment part 200. In this case, since a separation distance of the transfer belts 150 is narrower than a width of the equipment part 200, the transfer belt 150 is positioned between the equipment belts 250.

Accordingly, as shown in FIG. 12, the transfer belt 150 of the transfer part 100 and the equipment belt 250 of the equipment part 200 are positioned side by side, and the cassette that is transferred may move from the transfer belt 150 to the equipment belt 250. In this case, the cassette may be effectively transferred between the transfer part 100 and the equipment part 200 without a separate protrusion or groove While this disclosure has been described in connection with what is presently considered to be practical embodiments, it is to be understood that the disclosure is not limited to the disclosed embodiments, but, on the contrary, is intended to cover various modifications and equivalent arrangements included within the spirit and scope of the appended claims.

What is claimed is:

1. A transfer apparatus comprising:
    a transfer part;
    an equipment part separated from the transfer part, wherein
    a groove is disposed in one of the transfer part and the equipment part, and a protrusion is disposed in the other of the transfer part and the equipment part,
    the transfer part and the equipment part are connected by coupling of the groove and the protrusion,
    the transfer part is configured to transfer an object from the transfer part onto the equipment part, and
    an upper surface of the protrusion is level with an upper surface of at least one of the transfer part and the equipment part.

2. The transfer apparatus of claim 1, wherein
    a groove is disposed in the transfer part, and
    a protrusion is disposed in the equipment part.

3. The transfer apparatus of claim 1, wherein
    a groove is disposed in the equipment part, and
    a protrusion is disposed in the transfer part.

4. The transfer apparatus of claim 1, wherein
    the transfer part includes transfer belts positioned at edges of the transfer part,
    the equipment part includes equipment belts positioned at edges of the equipment part, and
    the object is transferred by rotation of the transfer belts and the equipment belts.

5. The transfer apparatus of claim 1, wherein
    the transfer part moves to delivers the object to the equipment part,
    the equipment part is fixed, and
    the object that has been processed in the equipment part is transferred back to the transfer part.

6. The transfer apparatus of claim 1, wherein the object on the transfer part has an H shape.

7. The transfer apparatus of claim 6, wherein a lower surface of the object does not directly contact the transfer part.

8. A transfer apparatus comprising:
    a transfer part; and
    an equipment part separated from the transfer part, wherein
    the transfer part includes transfer belts that are positioned at edges of the transfer part and rotate,
    the equipment part includes equipment belts that are positioned at edges of the equipment part and rotate, and
    a width of the entire equipment part, including the equipment belts, is narrower than a separation distance between the transfer belts positioned at the edges of the transfer part.

9. The transfer apparatus of claim 8, wherein
    an object is transferred in case that the transfer belts move forward,
    the transfer belts that have moved are positioned with the equipment belts between the transfer belts, and
    the object is transferred from the transfer belts to the equipment belts.

10. A transfer method comprising:
    moving a transfer part in which an object to be transferred is positioned;
    connecting the transfer part and an equipment part; and
    moving the object to be transferred from the transfer part to the equipment part, wherein
    a groove is disposed in one of the transfer part and the equipment part, and a protrusion is disposed in the other of the transfer part and the equipment part,
    the transfer part and the equipment part are connected by coupling of the groove and the protrusion, and
    an upper surface of the protrusion is level with an upper surface of at least one of the transfer part and the equipment part.

11. The transfer method of claim 10, wherein
    the transfer part includes transfer belts positioned at edges of the transfer part,
    the equipment part includes equipment belts positioned at edges of the equipment part, and
    an object is transferred by rotation of the transfer belts and the equipment belts.

12. The transfer method of claim 10, wherein
    a groove is disposed in the transfer part, and
    a protrusion is disposed in the equipment part.

13. The transfer method of claim 10, wherein
    a groove is disposed in the equipment part, and
    a protrusion is disposed in the transfer part.

14. A transfer method comprising:
    moving a transfer part in which an object to be transferred is positioned to face an equipment part; and
    moving transfer belts positioned at edges of the transfer part forward, wherein
    the transfer belts that have moved are positioned with the equipment part such that a front portion of the equipment part, which includes equipment belts, is disposed completely between the transfer belts as seen in plan view; and
    the object is transferred from the transfer belts to the equipment belts positioned on the equipment part.

15. The transfer method of claim 14, wherein a width of the entire equipment part, including the equipment belts, is narrower than a separation distance between the transfer belts.

16. A transfer method comprising:
    moving a transfer part in which an object to be transferred is positioned to face an equipment part; and
    moving transfer belts positioned at edges of the transfer part forward, wherein
    the transfer belts that have moved are positioned between equipment belts positioned at edges of the equipment part such that outer edges of the transfer belts directly face inner edges of the equipment belts as seen in plan view, and
    the object is transferred from the transfer belts to the equipment belts positioned on the equipment part.

17. The transfer method of claim 16, wherein a separation distance between the transfer belts is narrower than a separation distance between the equipment belts.

18. The transfer apparatus of claim 1, wherein
    the protrusion prevents the object from falling between the transfer part and the equipment part, and
    the groove does not move relative to at least one of the transfer part and the equipment part.

19. The transfer apparatus of claim 4, wherein at least one of the groove and the protrusion is disposed in a center of the transfer part between the transfer belts as seen in plan view.

* * * * *